(12) United States Patent
Abu Qahouq

(10) Patent No.: US 9,793,039 B1
(45) Date of Patent: Oct. 17, 2017

(54) CARBON NANOTUBE-BASED INTEGRATED POWER INDUCTOR FOR ON-CHIP SWITCHING POWER CONVERTERS

(75) Inventor: Jaber A. Abu Qahouq, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 13/464,783

(22) Filed: May 4, 2012

Related U.S. Application Data

(60) Provisional application No. 61/482,514, filed on May 4, 2011.

(51) Int. Cl.
| | |
|---|---|
| H01F 17/00 | (2006.01) |
| H01F 5/00 | (2006.01) |
| H01F 27/28 | (2006.01) |
| H01F 17/04 | (2006.01) |

(52) U.S. Cl.
CPC .......... H01F 17/00 (2013.01); H01F 5/00 (2013.01); H01F 27/28 (2013.01)

(58) Field of Classification Search
CPC ........ H01F 17/04; H01F 17/0006; H01F 5/00; H01F 27/2823; H01F 30/10; H01F 1/15316; H01F 1/18; H01F 30/06; H01F 17/045; H01F 29/146; H01F 19/04; H01F 27/34; H01F 41/0687; H01F 2924/00; H01L 2924/00; H01L 23/5227; B65H 55/00; G21K 1/093; H01B 3/08
USPC ....... 336/177, 205, 223, 220–222, 232, 200; 977/762
See application file for complete search history.

(56) References Cited

U.S. PATENT DOCUMENTS

| | | | | |
|---|---|---|---|---|
| 5,111,169 A | * | 5/1992 | Ikeda | ...................... H03H 7/427 333/181 |
| 5,557,138 A | * | 9/1996 | Ikeda | ...................... H01L 27/08 257/277 |
| 5,793,272 A | * | 8/1998 | Burghartz et al. | ............ 336/200 |
| 6,417,755 B1 | * | 7/2002 | Liu | ...................... H01F 17/0006 29/602.1 |
| 7,494,910 B2 | * | 2/2009 | Mouli et al. | ................... 438/599 |
| 7,671,714 B2 | * | 3/2010 | Tiemeijer | ............ H01F 17/0006 336/200 |
| 7,795,725 B2 | * | 9/2010 | Mouli et al. | ................... 257/712 |
| 2002/0003463 A1 | * | 1/2002 | Shin | ....................... B82Y 30/00 336/199 |
| 2002/0113335 A1 | | 8/2002 | Lobovsky | |
| 2003/0142520 A1 | | 7/2003 | Kimura | |
| 2003/0165648 A1 | | 9/2003 | Lobovsky | |
| 2004/0130415 A1 | * | 7/2004 | Chiba | ................ H01F 17/0013 333/185 |

(Continued)

OTHER PUBLICATIONS

Abu Qahouq, et al., U.S. Appl. No. 14/217,308, entitled, "Carbon Nanotube-Based Integrated Power Converters," filed Mar. 17, 2014.

*Primary Examiner* — Tsz Chan
*Assistant Examiner* — Kazi Hossain
(74) *Attorney, Agent, or Firm* — Maynard Cooper & Gale, P.C.; Jon Holland

(57) ABSTRACT

An inductor has a substrate and at least one coil of carbon nanotubes. A trench is formed in the substrate, and the carbon nanotubes are grown in the trench in order to form a coil for the inductor. In some embodiments, multiple coils may be formed in the trench as may be desired.

29 Claims, 14 Drawing Sheets

(56) References Cited

U.S. PATENT DOCUMENTS

| | | |
|---|---|---|
| 2005/0057189 A1 | 3/2005 | Kimura |
| 2005/0110473 A1 | 5/2005 | Mitsuo |
| 2005/0162206 A1 | 7/2005 | Kimura |
| 2005/0275497 A1* | 12/2005 | Ramadan et al. ............ 336/200 |
| 2007/0018190 A1* | 1/2007 | Kim et al. ...................... 257/99 |
| 2007/0243124 A1 | 10/2007 | Baughman |
| 2008/0122439 A1* | 5/2008 | Burdick et al. ............... 324/307 |
| 2008/0122567 A1* | 5/2008 | Su ........................... H01L 28/10 336/200 |
| 2008/0170982 A1 | 7/2008 | Zhang |
| 2008/0283267 A1* | 11/2008 | Werth ...................... H01B 1/04 174/68.1 |
| 2009/0014767 A1* | 1/2009 | Furukawa et al. ............ 257/301 |
| 2009/0027372 A1 | 1/2009 | Shishido |
| 2009/0315662 A1* | 12/2009 | Hijioka et al. ................ 336/200 |
| 2010/0066325 A1 | 3/2010 | Shionoiri |
| 2010/0303722 A1* | 12/2010 | Jin et al. ....................... 424/9.1 |
| 2011/0101933 A1 | 5/2011 | Lopata |
| 2011/0286144 A1* | 11/2011 | Ikriannikov .................. 361/268 |
| 2012/0244802 A1* | 9/2012 | Feng ................... H04B 5/0087 455/41.1 |
| 2013/0168598 A1 | 7/2013 | Xiong |
| 2013/0221937 A1 | 8/2013 | Yan |

\* cited by examiner

| Freq. (MHz) | Inductance (nH) | RDC(Ω) | Q | Current (A) | Dimensions (mm x mm x mm) |
|---|---|---|---|---|---|
| 5 | 93 | 15m | 156 | 0.2 | 0.15 x 0.15 x 0.35 |
| 20 | 91 | 15m | 598 | 0.2 | 0.15 x 0.15 x 0.35 |
| 50 | 90 | 15m | 1436 | 0.2 | 0.15 x 0.15 x 0.35 |

FIG. 27

CARBON NANOTUBE-BASED INTEGRATED POWER INDUCTOR FOR ON-CHIP SWITCHING POWER CONVERTERS

CROSS REFERENCE TO RELATED APPLICATION

This application claims priority to U.S. Provisional Patent Application No. 61/482,514, entitled "Carbon Nanotube-Based Integrated Power Inductor for On-Chip Power Converters," and filed on May 4, 2011, which is incorporated herein by reference.

BACKGROUND

Power converters are indispensable devices in electrical platforms and systems such as computing platforms, communication and mobile systems, medical systems, electric vehicles, military systems, renewable energy systems, aerospace systems, and almost all peripherals and devices. These systems and related applications impact people's daily life. A Department of Energy (DOE) Advanced Research Projects Agency-Energy (ARPA-E) workshop of Mar. 2, 2010 concluded that new technology for power electronics and power converters is critical for achieving higher energy efficiency and significant cost reduction and size. The new technology would also promote the United States as a technology leader. Generally, there was agreement at the conference that breakthroughs in power electronics research and technology are critical for reducing energy consumption of these systems by 25-30%. The workshop participants also acknowledged that the use of power electronics circuitries will increase and become a larger part of many systems resulting in improving system energy efficiency by more than 80%.

Power converters convert voltage or current from one level to another and/or from one form to another in order to supply energy to a specific load. Such power converters are of several types, such as DC-DC power converters, AC-DC power converters, DC-AC power inverters, and AC-AC power inverters. Switching DC-DC power converters have the advantage of much higher energy efficiency as compared with converters using linear regulators. However, the switching DC-DC power converter is generally larger than the linear regulator converter primarily because it typically requires power inductors, power transformers, more switching power devices and control circuits. Nonetheless, the switching DC-DC power converters are widely used especially when the energy efficiency is crucial.

In general, the integration and size reduction of other technologies, such as Integrated Circuits (ICs) for microprocessors and other general purpose processors (e.g., graphic ICs and communications ICs), are advancing at a faster pace than switching power converter technologies. Integrating power converters on-chip yields several advantages such as smaller size, lighter weight, reduced distribution, reduced distribution losses, and potentially reduced the EMI (Electromagnetic Interferences).

Magnetic power devices for switching converters include power inductors and power transformers. These magnetic power devices usually occupy more than 30% of the total switching power converter board space and are usually the most difficult components to integrate on-chip. Such integration is particularly difficult with small chips having low power losses and that require high inductance density. Hence, there is a significant inductor technology challenge for on-chip integrated power converters and for System-On-a-Chip (SoC) devices.

When the dimensions of solid materials are reduced to nanometer size, the materials often exhibit new and interesting behavior which can constitute the basis for a new generation of electronic devices. Nano-particles may exhibit unexpected and strange physical and chemical properties compared to conventional or classical materials. For example, copper is a good conductor, while the nano-copper is an insulator. Similarly, nano-magnetic materials have higher density and higher permeability than conventional classical materials. Hence, nanotechnology may help achieve reliable nanometer-scale power devices with small footprints and reduced power consumptions. Consequently, there is a need to develop new nanotechnology-based power devices that can result in transformative advances.

A DC-DC switching power converter typically comprises switching power devices such as MOSFETs (Metal Oxide Field Effect Transistor), an analog and/or digital control circuit, filter capacitors, power inductors, and sometimes power transformers. Switching power devices and control circuits can be easily integrated on a single chip, but the power inductors are often bulky and difficult to integrate with other components. In most cases, power inductors are off-chip components, which typically is an obstacle for reducing the size of switching power converters. Moreover, the power inductor is often one of the largest components in a switching power converter, and it is accountable for much of the weight and the size of a switching power converter. For example, in a DC-DC buck power converter with a 5V-12V input, a 1V output and a 10 W load, the inductor typically makes up more than 30% of the total switching power converter size.

For many electronic systems, it is desirable to develop integrated DC-DC power converters for System on Chip (SoC) applications. The most common approach to integrate power converters include: Power System in Package (PSiP) and Power System on Chip (PSoC). PSiP uses off-shelf power inductors in order to supply large power requirements, but such inductors limit size reduction. PSoC integrates power inductors directly on IC (Integrated Circuit) chips. Such an approach can minimize size by taking advantages of known micro-fabrication technologies. However, the small achievable inductance value (or inductance density) and the low quality factor (high power loss) of inductors fabricated using conventional technologies put constraints on footprint reduction.

Therefore, it appears to be advantageous to replace conventional technology with nanotechnology to achieve reliable nanometer-scale power devices with smaller footprints and less power consumption. Scaling the power inductor to nanometer size helps to reduce converter size. Nanotechnolgy power inductors would provide for high-density on-chip integration of the power converters resulting in optimum power management, lower discrete component count, smaller footprint, lower distribution losses, and lower parasitic delays.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 27 is a table illustrating exemplary characteristics of an inductor of the present disclosure.

DETAILED DESCRIPTION

Figure 1:
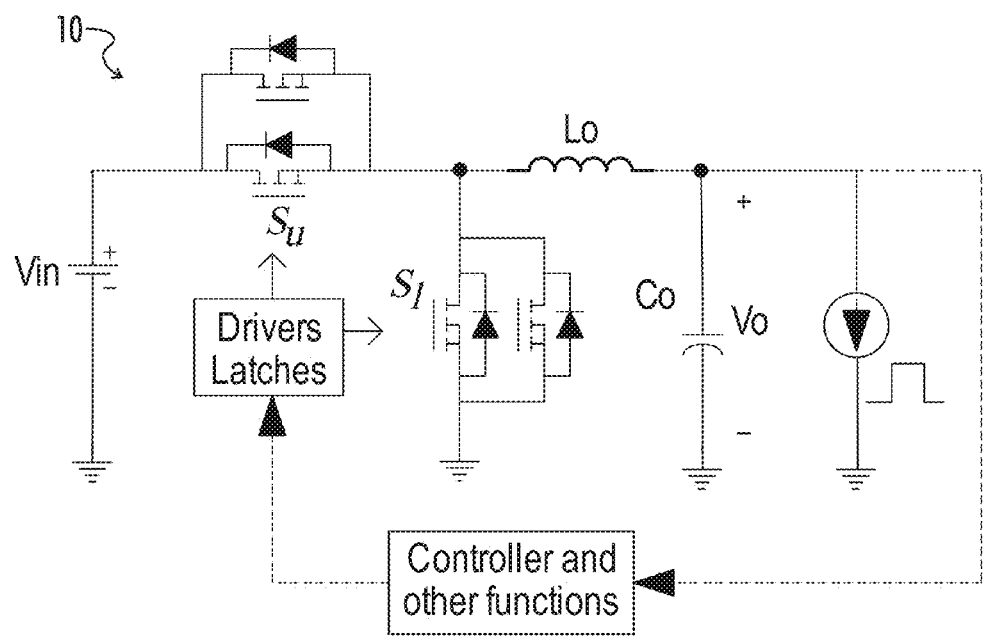
FIG. 1 is a circuit diagram illustrating a single phase switching converter.

A circuit for a DC-DC switching power converter 10 is depicted in FIG. 1 in a single-phase topology. The input to the converter 10 is a DC voltage source, Vin. Switches, Su and Si, of the converter are controlled by signals from a controller. A power inductor, Lo, and a capacitor, Co, are energy storage components of switching power converter 10. Switching power converter 10 is often used for supplying power to hand-held and other small electronic devices. It is therefore desirable for the converter 10 to be as small as possible. Conventional inductors, such as Lo, typically account for more than 30% of the board space on a printed circuit board or substrate where components of the converter are mounted. Hence, one way to significantly reduce the size of a converter is to reduce the size of the power inductor. Embodiments of a new type of power inductor, formed by carbon nanotubes, are described herein. Such embodiments of the new type of power inductor demonstrate that power inductor size may be significantly reduced while still providing inductance functionality required for converters and other electronic systems.

Figure 2:
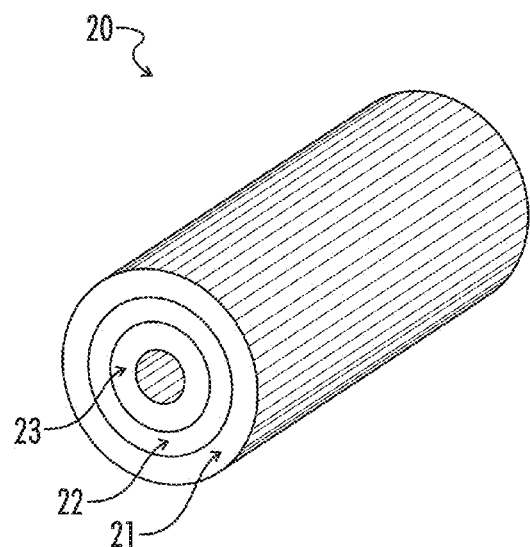
FIG. 2 depicts an exemplary structure of concentric multi-walled carbon nanotubes.

A carbon nanotube (CNT) 20, as depicted in FIG. 2, has properties that can be used to fabricate the new type of inductor. The CNT 20 as depicted in FIG. 2 has three concentric nanotubes 21-23 and, as shown, is generally referred to as a multi-walled carbon nanotube. CNTs are comprised of carbon or carbon composites. Carbon composites for inductors and transformers may include carbon combined with magnetic materials such as Iron, Cobalt or mixtures of such elements. The composites change the characteristics of the nanotubes in such a way that the CNTs allow for a reduction in size of power inductors and transformers. In addition, for some embodiments of inductors and transformers, CNTs 20 are coated with a conducting metal, or alloy, such as Titanium. When the CNTs 20 are coated with such metals, the resistance of a bundled structure of CNTs 20 is reduced so that the end-to-end resistance of the bundle is reduced. A reduction in such resistance provides a higher quality factor, Q, for the power inductor.

In general, composites or nano-composites, especially iron (Fe) and CNTs, are of interest for making power inductors because of their ferromagnetic characteristics. Further, Fe serves as a catalyst for growing nanotubes, thereby resulting in Fe being incorporated into the CNT during fabrication. Additionally, CNT-Fe nano-particles are strong and have greater conductivity than most conventional particles.

Figure 3A:
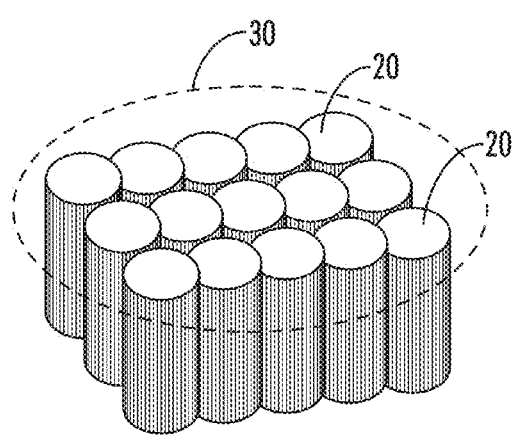
FIG. 3A depicts a bundle of multi-walled nanotubes that can be used to form magnetic elements, such as inductors and transformers.
Figure 3B:
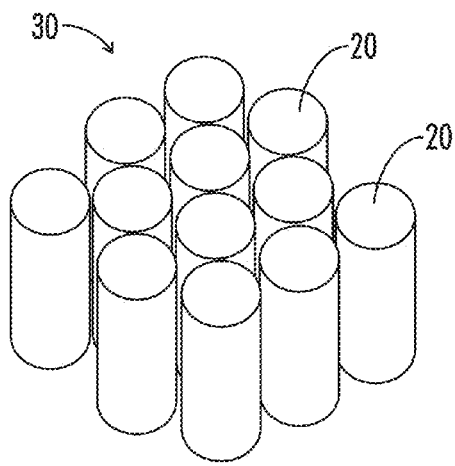
FIG. 3B depicts a generally circular bundle of multi-walled nanotubes.

A bundled arrangement 30 of CNTs 20 is depicted in FIG. 3A. As shown in FIG. 3A, there are 15 CNTs 20 in the bundle. The number of CNTs 20 in a bundle may vary from just a few to thousands. The CNTs 20 in the bundle may be concentric nanotubes or other types of nanotubes. The number of nanotubes in the bundle and the diameter of the nanotubes determine the overall size of the bundle. The dimensions of bundles can vary from several nanometers to around several hundred micrometers. The dimensions of the bundles, the coatings on the nanotubes and the materials used for the nanotubes are factors that determine the characteristics of the inductor. FIG. 3B shows a generally circular arrangement 30 of CNTs 20.

Figure 4:
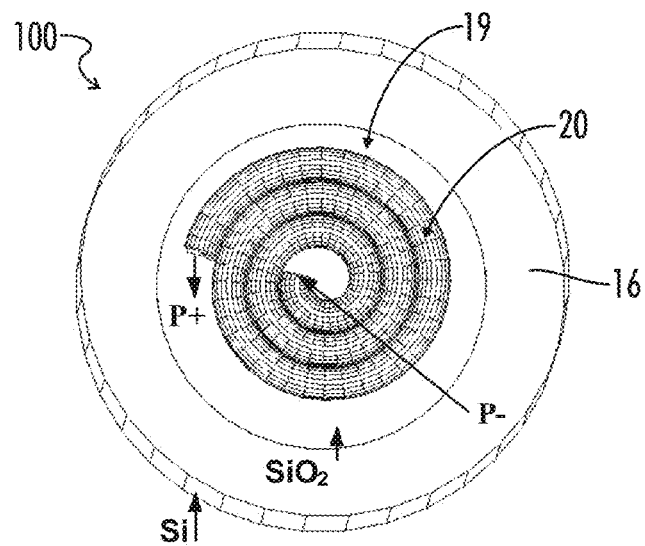
FIG. 4 depicts an exemplary embodiment of an inductor of the disclosure.
Figure 5:
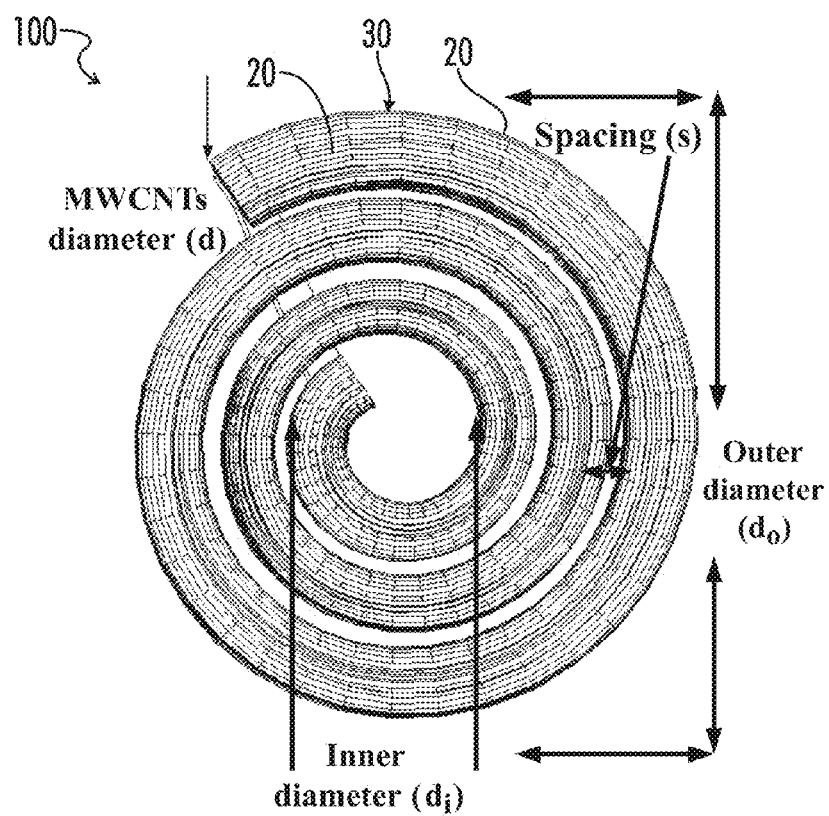
FIG. 5 shows a coil of the inductor of FIG. 4.

An exemplary embodiment of a CNT inductor 100 in accordance with the present disclosure is depicted in FIG. 4. The inductor 100 comprises bundles 30 of CNTs 20 (e.g., 2500 bundles of multi-walled carbon nanotubes) forming a conductive coil 19 mounted on a substrate 16. The cross-sectional shape of the coil 19 is circular, but other cross-sectional shapes are possible in other embodiments. The coil 19 may be formed by positioning circular bundles 30 of CNTs 20, similar to the bundle 30 shown by FIG. 3B, end-to-end such that an end of a CNT 20 of one bundle 30 abuts an end of a CNT 20 of the next bundle 30.

The exemplary Inductor 100 of FIG. 4 is a power inductor, i.e., an inductor having characteristic for use as a component of a switching power supply. Inductor 100 may also be referred to as a bundled multi-walled carbon nanotube (BMWCNT) inductor. The substrate 16, which is comprised of Silicon or some other substrate material, provides the support structure for the CNTs 20. Substrate 16 has an area of around 0.15 mm by 0.15 mm and a thickness of around 350 μm, although other dimensions for the substrate 16 are possible. A deposition of Silicon Dioxide ($SiO_2$) or some other material on the substrate 16 provides an isolation layer between the substrate 16 and the coil 19. The exemplary coil 19 has a spiral shape with three turns and has an approximate area of 0.12 mm by 0.12 mm. Other shapes and dimensions for coils 19 are possible in other embodiments. For one embodiment, the nanotube of FIG. 4 is a composite of Carbon (84%) and Iron (16%). In other embodiments other composites may be used.

Figure 6A:
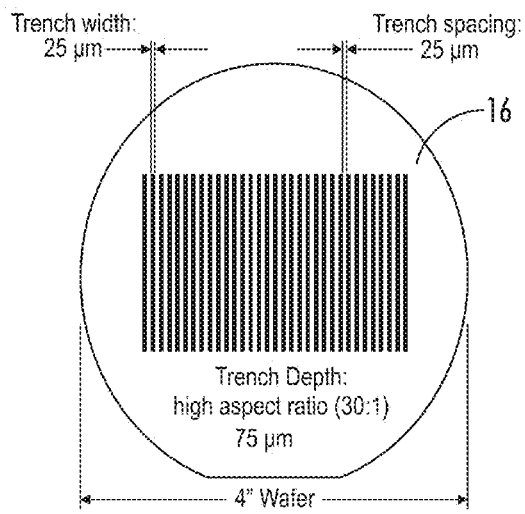
FIG. 6A is a top view illustrating an exemplary substrate having rectangular trenches.
Figure 6B:
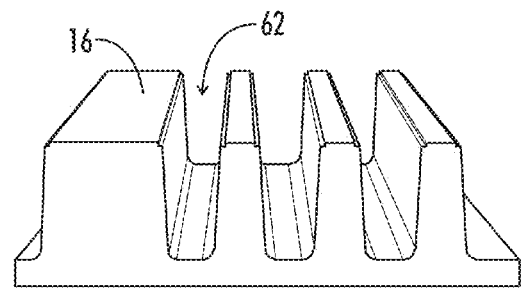
FIG. 6B is a three-dimensional perspective illustrating the substrate of FIG. 6A
Figure 7A:
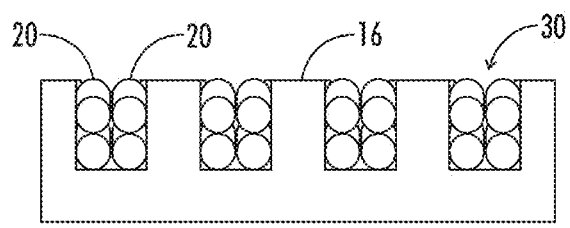
FIG. 7A is a side view illustrating the substrate of FIG. 6A after carbon nanotubes have been formed in the trenches.
Figure 7B:
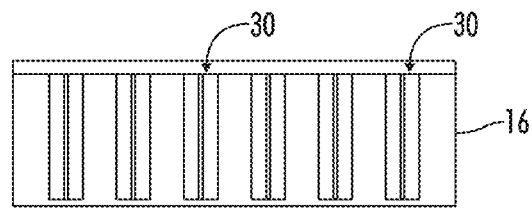
FIG. 7B is a top view illustrating the substrate and carbon nanotubes of FIG. 7A.

FIGS. 6A and 6B depict views of a substrate 16 with trenches 62. In one embodiment, the substrate 16 is comprised of Silicon, but other substrate materials are possible in other embodiments. The size of a trench 62 depends on the dimensions of the bundled CNTs 20 that are to reside in the trench 62. The shape of trench 62 as depicted in FIGS. 6A and 6B is straight. Other shapes, such as a spiral are possible. FIGS. 7A and 7B depict bundles 30 of CNTs 20 in the trenches 62 of the substrate 16. Although the number of CNTs 20 depicted in each bundle 30 of FIGS. 7A and 7B is four, other numbers of CNTs 20 in each bundle 30 are possible in other embodiments.

Figure 8:
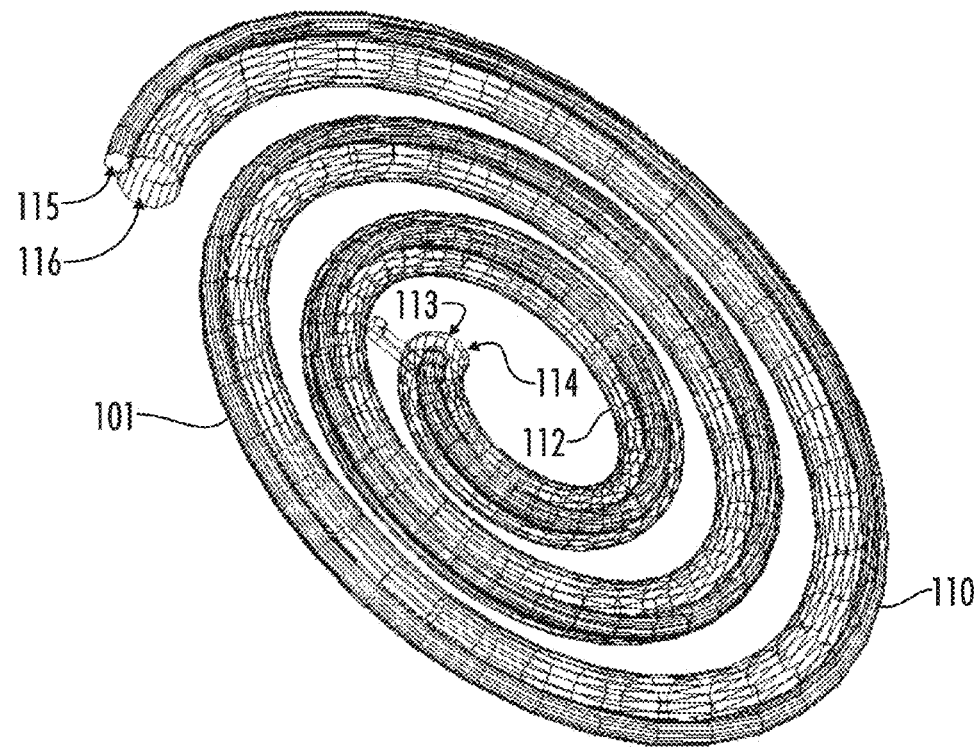
FIG. 8 depicts an exemplary embodiment of coils of bundled multi-walled carbon nanotubes with three turns.
Figure 9:
FIG. 9 depicts a cross-sectional view of an inductor having the coils of FIG. 8 positioned on a trenched substrate.
Figure 10:
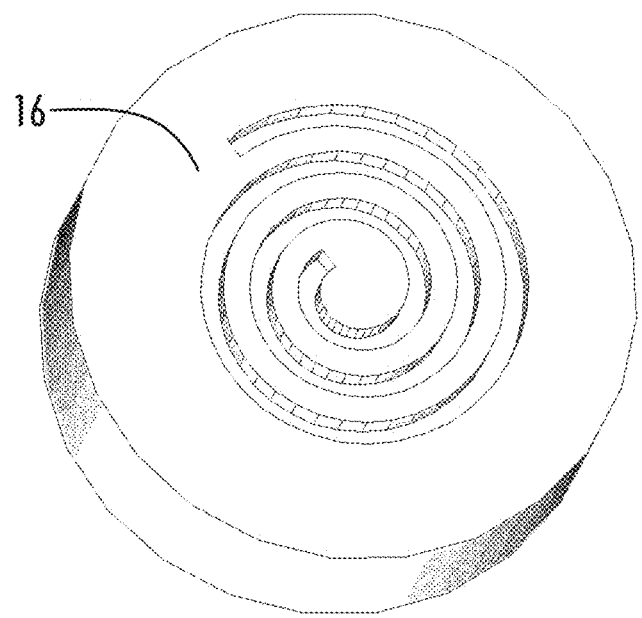
FIG. 10 is a top view illustrating substrate having a spiraled trench for receiving the coils depicted by FIG. 8.
Figure 11:
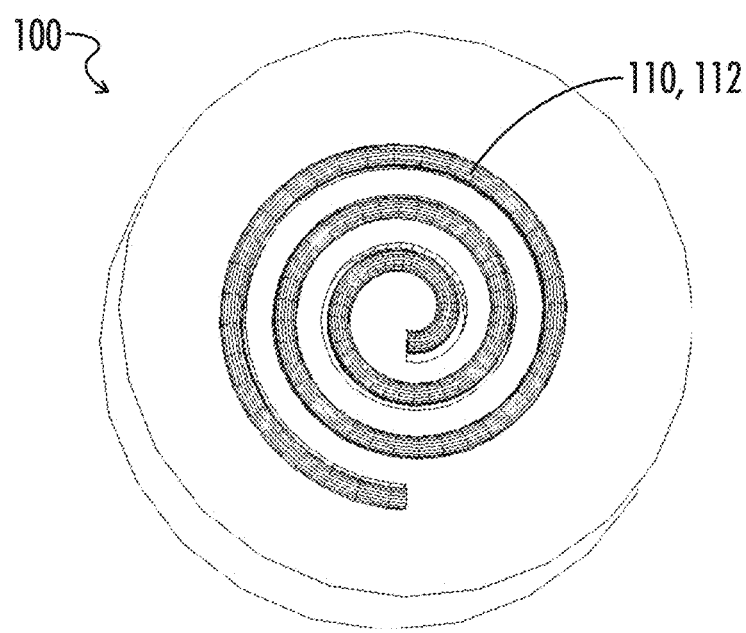
FIG. 11 is a top view illustrating the substrate of FIG. 10 after the coils of FIG. 8 have been formed in a trench of the substrate.

FIG. 8 depicts another exemplary embodiment of an inductor 101 of the present disclosure, similar to the embodiment of FIG. 4, except that the inductor 101 has two coils 110, 112 in which each coil is a different size relative to the other coil. The coils 110, 112 are coated with a conductor so their end-to-end resistance is reduced. The adjacent ends 113, 114 of the coils 110, 112 form one terminal of the inductor 101 and the other adjacent ends 115, 116 of the coils 110, 112 form another terminal of the inductor 101. In addition, a space between the coils 110, 112 of the spiral limit parasitic capacitance. FIG. 9 depicts the coils 110, 112 of FIG. 8 formed on a trenched substrate 16, which is comprised of Silicon or some other substrate material. FIG. 10 depicts a top view of the trenched substrate 16 of FIG. 9, and FIG. 11 depicts a top view of FIG. 9.

Figure 12:
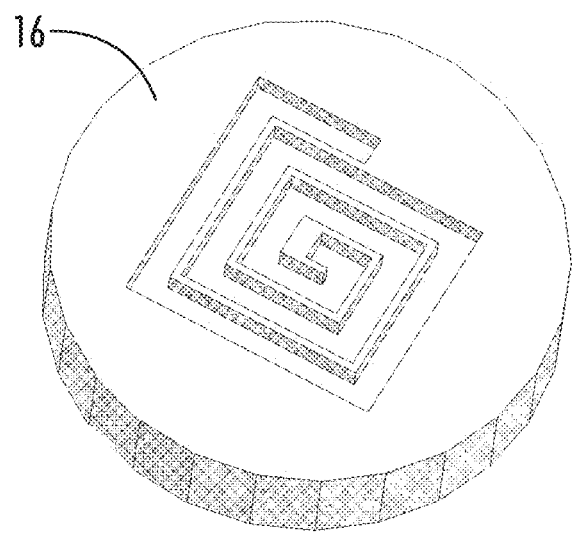
FIG. 12 is a top view illustrating an exemplary substrate having a rectangular trench.
Figure 13:
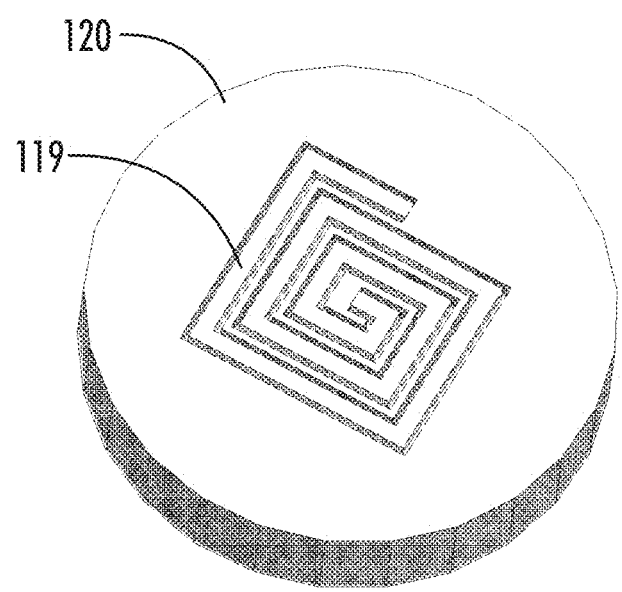
FIG. 13 is a top view illustrating the substrate of FIG. 12 after a coil of bundled multi-walled carbon nanotubes has been formed in the trench.

A substrate 16 with a rectangular-spiraled trench for guiding the growth of CNTs is depicted in FIG. 12. A variety of other shapes of trenches are possible in other embodiments. FIG. 13 depicts the substrate 16 of FIG. 12 after a coil 119 of bundled CNTs 20 have been grown in the trench in order to form an inductor 120. In some embodiments the trench may also be filled with low dielectric material to reduce capacitances and other parasitic components.

Figure 14:
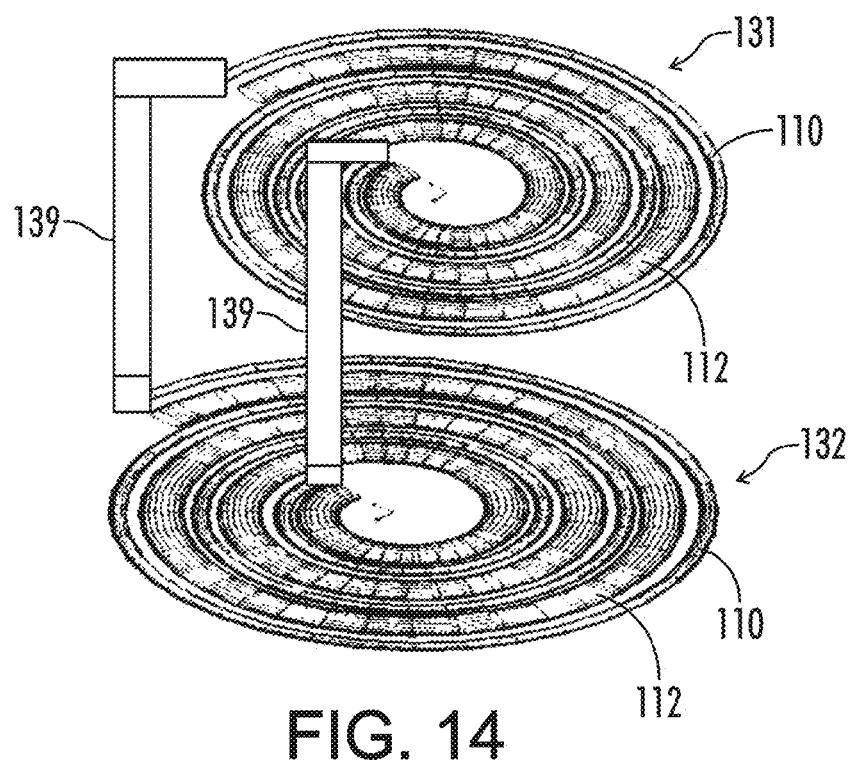
FIG. 14 depicts a stacked arrangement of the coils depicted by FIG. 8.
Figure 15:
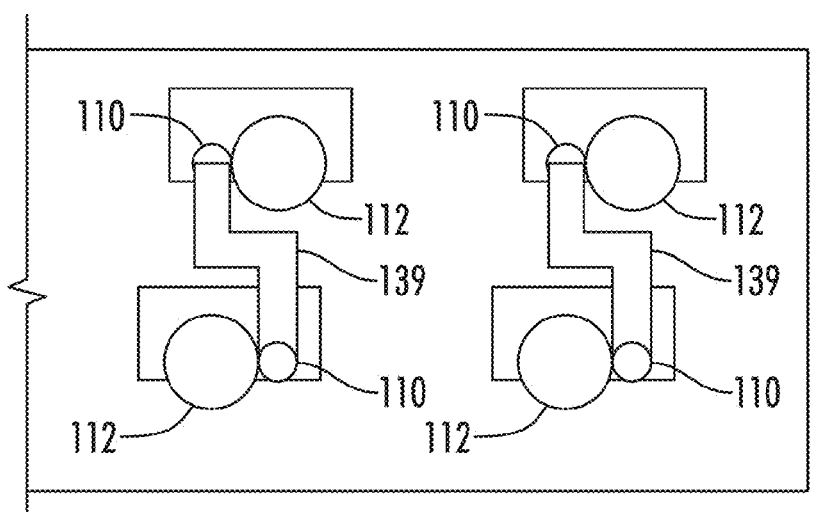
FIG. 15 depicts coils of FIG. 14 positioned on a substrate.

FIG. 14 depicts a first set 131 of coils 110, 112 and a second set 132 of coils 110, 112 that may be used to form an inductor or a transformer. As shown by FIG. 15, an end of the coil 110 of set 131 is connected to end of the coil 110 of set 132 by conductive vias 139.

Figure 16:
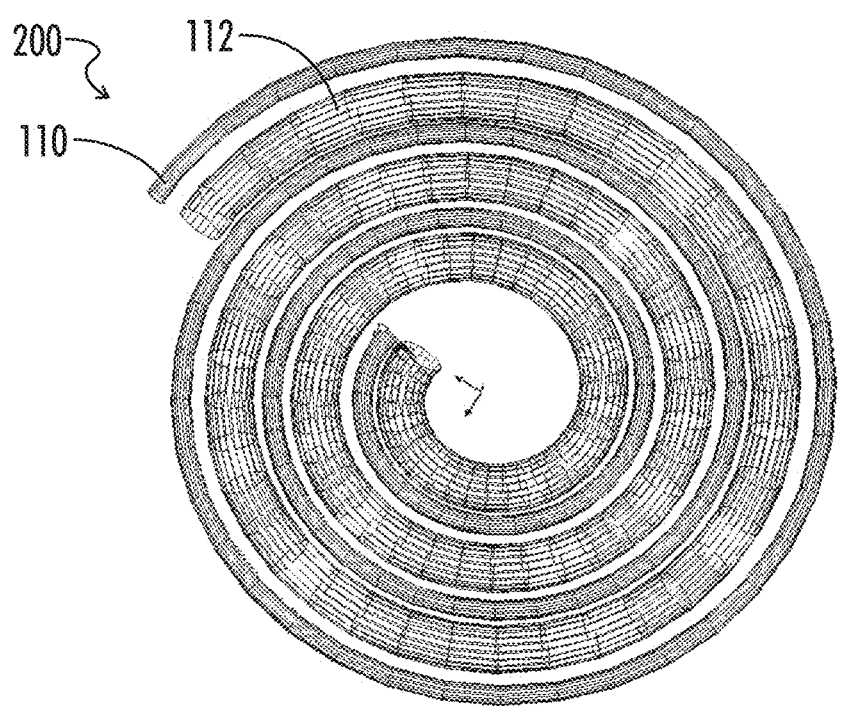
FIG. 16 depicts an embodiment of a transformer formed by carbon nanotubes in accordance with the present disclosure.

FIG. 16 depicts an exemplary embodiment of a coil arrangement 200 for a power transformer having a large coil 112 and a smaller coil 110. The coil arrangement 200 is the same as that shown by FIG. 8 except that the coils 110, 112 are electrically separated. The coil 110 may form one winding of a transformer, and the coil 112 may form another winding of the transformer. A separation between the coils 110, 112 is sufficient to reduce transformer degradation caused by parasitic components. Although the arrangement 200 as shown has a one-to-one turn ratio, other turn ratios are possible in other embodiments. The coils 110, 112 may be formed on substrate 16 having trenches, such as is depicted by FIG. 11.

Figure 17:
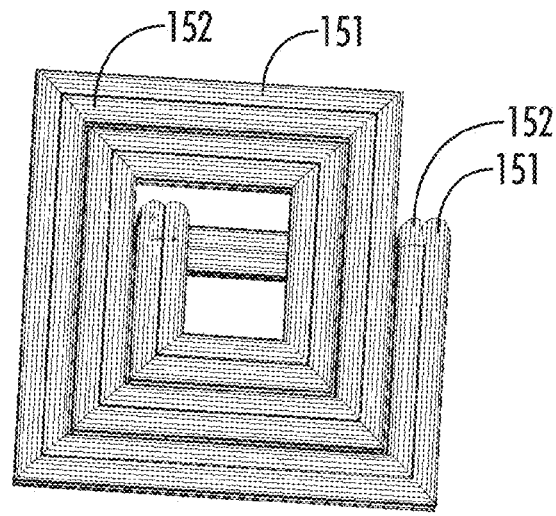
FIG. 17 shows an embodiment of a rectangular structure of nanotubes for an inductor in accordance with the present disclosure.
Figure 18:
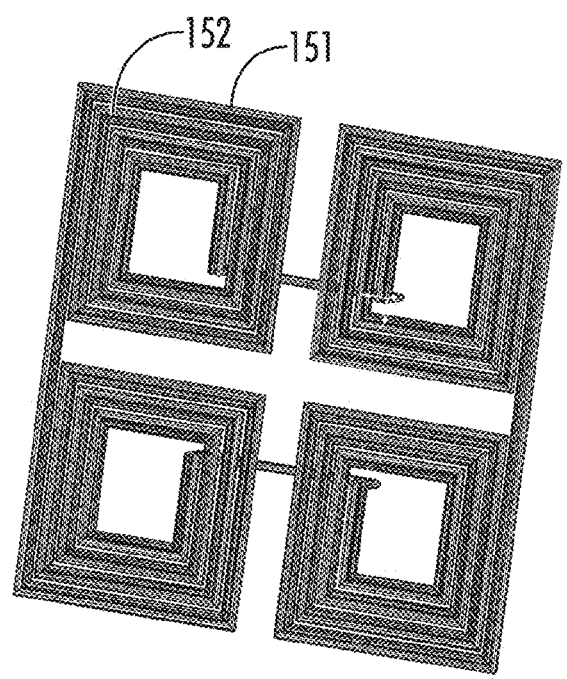
FIG. 18 shows an embodiment of a plurality of rectangular structures of nanotubes of FIG. 17 connected in series.

FIG. 17 depicts an exemplary embodiment of coils 151, 152 of bundled CNTs 20 for an inductor or other device. The coils 151, 152 are in a parallel arrangement and form a single-layer rectangular structure. FIG. 18 depicts four single-layer structures connected in a series arrangement.

Figure 19A:
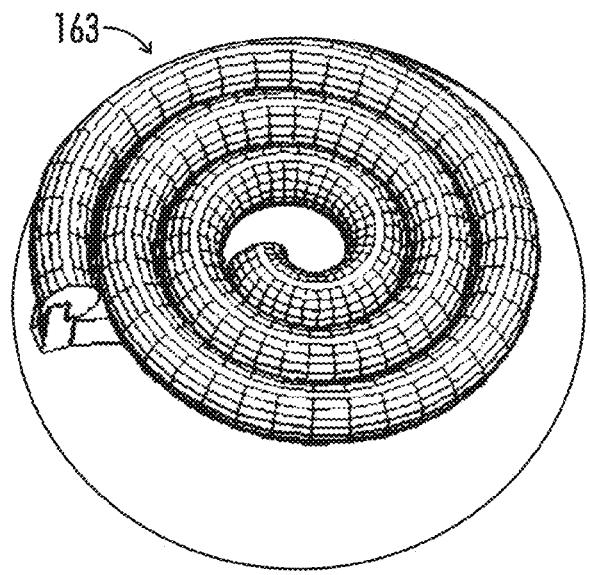
FIG. 19A shows an embodiment of a spiraled coil of carbon nanotubes in accordance with present disclosure.
Figure 19B:
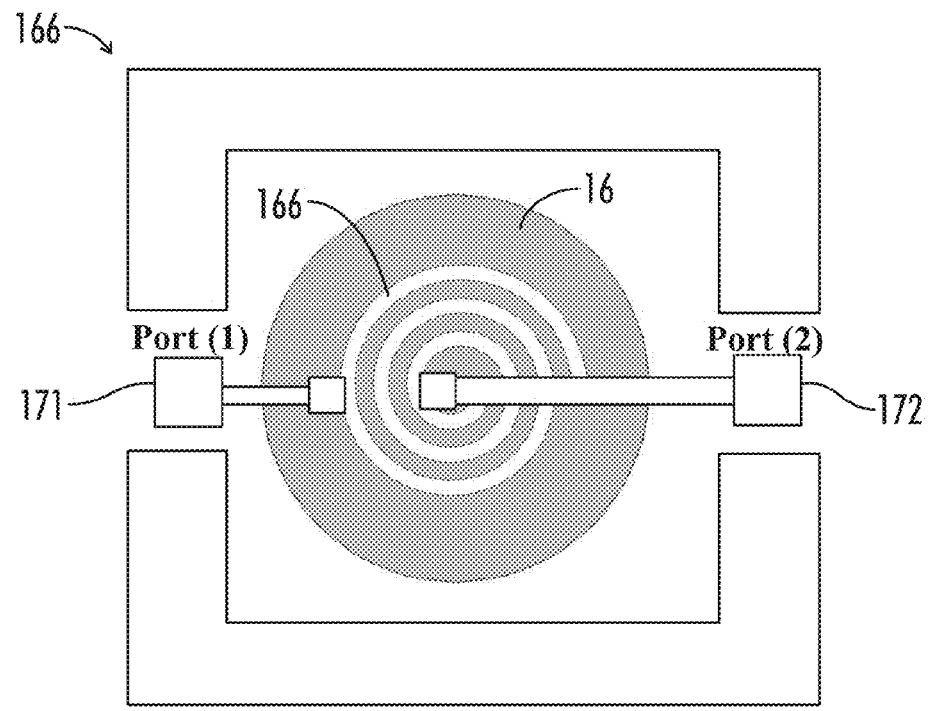
FIG. 19B shows the coil of FIG. 19A positioned on a substrate of an inductor.

Another exemplary embodiment of a coil 163, having a spiral structure, used to form an inductor 166 is depicted in FIG. 19A. The coil 163 comprises bundled CNTs 20, which include a magnetic material, such as iron, in addition to carbon. The magnetic material increases the inductance to a value greater than for coils comprised solely of carbon. The coil 163 for the embodiment of FIG. 19A is also coated or electroplated with Titanium or other conducting material. Other conducting materials include, but are not limited to, Pd, Pt, Cu and Au. As shown by FIG. 19B, each end of the coil 163 is conductively coupled to a respective port 171, 172 that may be used for connecting inductor 100 into an electrical circuit (not shown in FIG. 19B), such as a circuit of a switched power supply.

Figure 20:
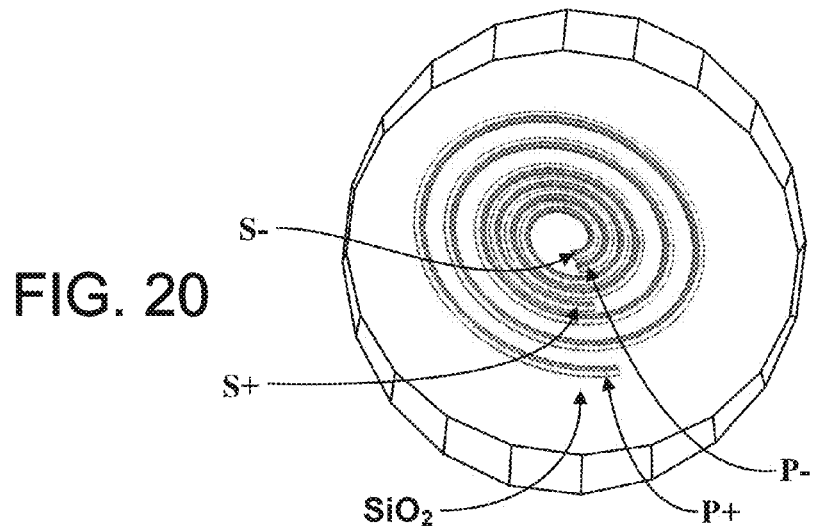
FIG. 20 depicts an embodiment of a transformer formed by spiral coils in accordance with the present disclosure.

An exemplary embodiment of a transformer 200 of the disclosure is depicted in FIG. 20. A first coil 281 of bundled CNTs 20 with a spiral shape has two turns. A second coil 282 of bundled CNTs 20 with a spiral shape and has four turns. The coils 281-282 are parallel to one another over the two turns starting from the center of the spirals. The turn ratio for the transformer 200 of the embodiment of FIG. 20 is 2:1. Other turn ratios are possible in other embodiments. The ends S+, S– of the first coil 281 provide connection terminals for the first coil 281, and the ends P+, P– of the second coil 282 provide connection terminals for the second coil 282. The coils 218, 282 may be composites of carbon and magnetic materials. In some embodiments the coils 281, 282 may be coated with a metal.

Figure 21A:
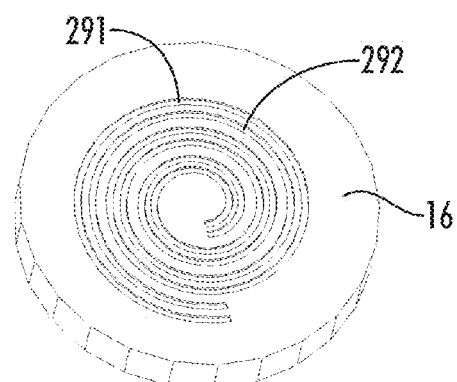
FIG. 21A depicts parallel spiral trenches in a substrate providing a structure for growing carbon nanotubes.
Figure 21B:
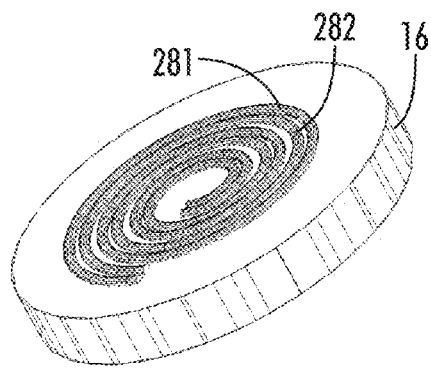
FIG. 21B shows carbon nanotubes within the structure of FIG. 21A.
Figure 22:
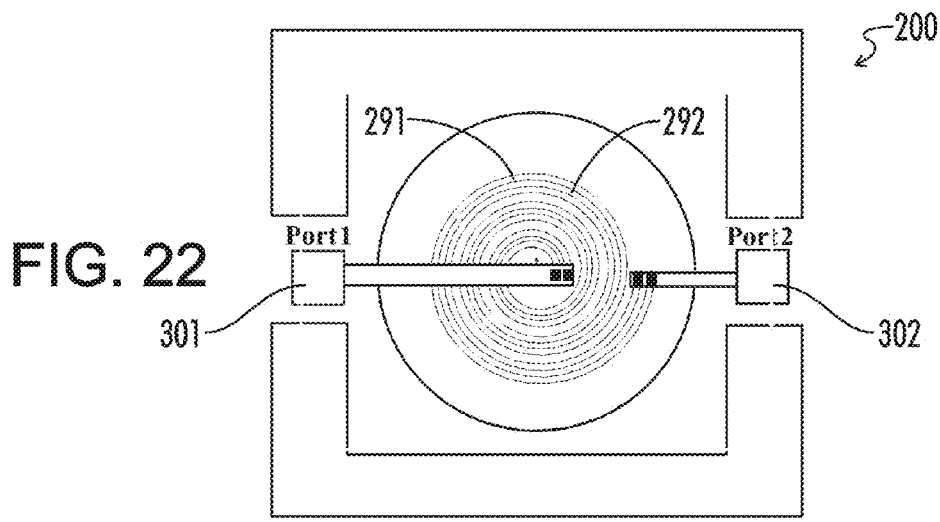
FIG. 22 shows the transformer of FIG. 20 connected to ports.

FIG. 21A shows two parallel trenches 291, 292 in a substrate 16 in a pattern to form transformer 200 of FIG. 20. After the trenches 291, 292 have been etched in the substrate 16, BMWCNTs are grown in the trenches as shown in FIG. 21B. In one embodiment, each trench 291, 292 is filled with a low dielectric material to reduce the effects of unwanted capacitance and other parasitic elements. As shown by FIG. 22, ends of the coils 291, 292 are conductively coupled to a port 301, and ends of the coils 291, 292 are conductively coupled to a port 302. The ports 301, 302 may be used for connecting transformer 200 into an electrical circuit (not shown in FIG. 22).

Figure 23:
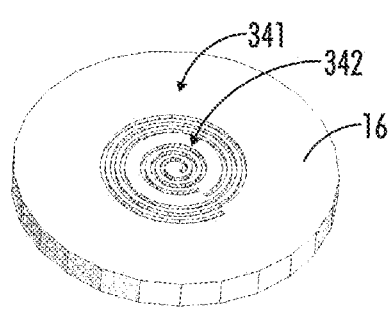
FIG. 23 depicts concentric spiral trenches in a substrate providing a structure for growing carbon nanotubes.
Figure 24:
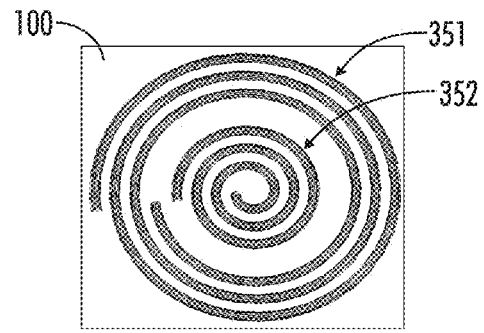
FIG. 24 depicts carbon nanotubes having the structure defined by the concentric spiral trenches of the substrate shown in FIG. 23.

FIG. 23 shows a substrate 16 with two circular trenches 341, 342 to guide the growth of CNTs for a non-symmetrical coupled inductor. BMWCNTs are grown in the trenches 341, 342 to form two separate inductors 351, 352, as shown in FIG. 24. Each trench 341, 342 may be filled with a low dielectric material to reduce the effects of unwanted capacitance and other parasitic elements. When the coupling between the inductors 351, 352 is small, each inductor may serve as an independent circuit element.

Figure 25:
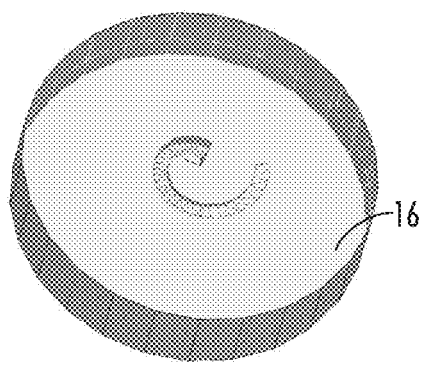
FIG. 25 depicts helical trenches in a substrate providing a structure for growing carbon nanotubes.
Figure 26:
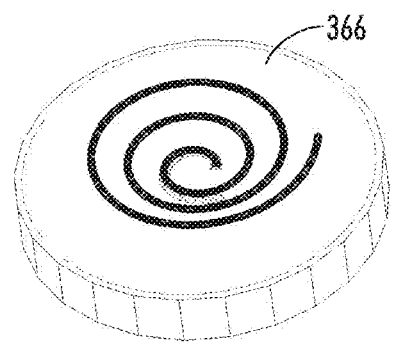
FIG. 26 depicts carbon nanotubes having the structure defined by the helical trenches of the substrate shown in FIG. 25.

FIG. 25 shows a substrate 16 with a helix circular trench 362 to guide the growth of CNTs for an inductor with a helix structure. BMWCNTs are grown in the trench 362 to form a helix inductor 366, as shown in FIG. 26. The trench 362 is filled with a low dielectric material to reduce the effects of unwanted capacitance and other parasitic elements.

Embodiments of inductors described herein are often elements of power converters, such as depicted in FIG. 1. Such inductors are often required to operate over a range of switching frequencies going from 5 to 50 MHz. Exemplary characteristics of an inductor for use with a 10 W converter are shown in a table of FIG. 27. The first column of the table lists several operational frequencies for the inductor. The value of the inductance remains at an approximate value of 90 nHs for each of the frequencies as seen in the table's second column. The DC resistance is expected to be around 15 mΩ for each of the frequencies. The quality factor, Q, for inductor 100 has values going from 156 to 1436 as shown in the table's fourth column. High values of Q are considered desirable for inductors that are elements of a switched power converter or other device. Conventional inductors typically have Q's between 10 and 30. A power converter providing 10 watts causes a current of about 0.2 A to flow in the inductor, and such a current is within the limits of a carbon nanotube inductor. The substrate area for the inductor is around 0.15 mm by 0.15 mm as shown in the last column of the table. Conventional inductors require an area at least 50 times the area required by the inductor 100 that is comprised of carbon nanotubes.

The fabrication method of this disclosure is not limited to fabrication of inductors or transformers. Other elements such as capacitors, solar cells, antennas and other devices may be fabricated using the trenches concept to facilitate the growth of single-walled, multi-walled, bundled single-walled, and bundled multi-walled nanoparticles. The mixture of compounds or alloys with carbon to enhance formation of CNTs is possible.

This disclosure also includes the use of different volumetric loading of compound and alloy to grow carbon nanotube in specific and desired shapes. For example, cobalt nanoparticles used as catalysts in the growth of multiwall carbon nanotubes (MWCNTs) aligned perpendicular to a substrate and iron nanoparticles as catalysts to grow single-walled carbon nanotubes aligned parallel to the substrate.

It should be noted that various types of fabrication processed can be used to form the devices described herein. In one exemplary embodiment, a substrate (e.g., Silicon) is etched via conventional fabrication processes, such as deep reactive ion-etching (DRIE) to form a trench of a desired shape. Then, the substrate is placed in a chemical vapor deposition (CVD) chamber, which uses Argon gas for purging. A bundle of MWCNTs is then deposited in the trenches using CVD. In this regard, the CVD chamber is set to a desired temperature, and Fe-catalyst nanoparticle is used as a fixed catalyst layer. A hydrocarbon source is introduced into the chamber for thermal decomposition and growth of the carbon nanotubes. Further, the CNT bundles are electroplated with TiN or other material (the nitride is used to prevent the oxidation of Ti when exposed to oxygen during the synthesis of carbon nanotubes). The steps of growing MWCNTs and electroplating can then be repeated to add more bundles of MWCNTs. In other embodiments, other fabrication processes and materials may be used.

Now, therefore, the following is claimed:

1. An inductor comprising: a substrate having a spiraled trench; and a first coil of carbon nanotubes positioned in the spiraled trench, wherein the first coil has a segment comprising at least a first bundle of carbon nanotubes positioned in the spiraled trench and a second bundle of carbon nanotubes positioned in the spiraled trench, wherein the first and second bundles are positioned end-to-end such that at least one carbon nanotube of the first bundle has an end that abuts an end of at least one carbon nanotube of the second bundle; and a second coil of carbon nanotubes positioned in the spiraled trench, wherein the second coil is electrically separated from the first coil and spirals in a same direction as the first coil, and wherein a width of the first coil is different than a width of the second coil.

2. The inductor of claim 1, wherein the carbon nanotubes comprise carbon and a magnetic material.

3. The inductor of claim 1, wherein the spiraled trench contains dielectric material.

4. An inductor comprising:
a substrate having a spiraled trench;
a first coil of carbon nanotubes positioned in the spiraled trench; and
a second coil of carbon nanotubes positioned in the spiraled trench, wherein the second coil is electrically separated from the first coil within the spiraled trench and spirals in a same direction as the first coil, and wherein a width of the first coil is different than a width of the second coil.

5. The inductor of 1, wherein the inductor is a circuit element of a switched power converter.

6. A transformer, comprising:
a substrate having
first coil of carbon nanotubes positioned in the spiraled trench; and
second coil of carbon nanotubes positioned in the spiraled trench,
wherein the transformer is a circuit element of a switched power converter, wherein the second coil is electrically separated from the first coil within the spiraled trench and spirals in a same direction as the first coil, and wherein a width of the first coil is different than a width of the second coil.

7. The transformer of claim 6, wherein the carbon nanotubes of the first coil comprise carbon and a magnetic material.

8. The transformer of claim 6, wherein the spiraled trench contain dielectric material.

9. A magnetic circuit element, comprising:
a substrate having a trench;
a first coil of carbon nanotubes positioned in the trench; and
a second coil of carbon nanotubes positioned in the trench, wherein the second coil is electrically separated from the first coil within the trench and extends in a same direction as the first coil, and wherein a width of the first coil is different than a width of the second coil.

10. The magnetic circuit element of claim 9, wherein the nanotubes of the first coil comprise carbon and a magnetic material.

11. The magnetic circuit element of claim 9, wherein the magnetic circuit element is a component of a switching converter.

12. The inductor of claim 1, wherein the first bundle has a plurality of layers of carbon nanotubes positioned in the spiraled trench, and wherein the second bundle has a plurality of layers of carbon nanotubes positioned in the spiraled trench.

13. A method of forming coils for an inductor, wherein the coils comprise comprises carbon nanotubes, the method comprising:
  providing a substrate;
  forming a spiraled trench in the substrate; and
  growing the carbon nanotubes in the spiraled trench thereby forming a first coil and a second coil in the spiraled trench, wherein the second coil is electrically separated from the first coil within the spiraled trench and spirals in a same direction as the first coil, and wherein a width of the first coil is different than a width of the second coil.

14. The method of claim 13, wherein the coil has a segment comprising at least a first bundle of carbon nanotubes and a second bundle of carbon nanotubes, wherein the growing comprises:
  growing the first bundle of carbon nanotubes in the spiraled trench; and
  growing the second bundle of carbon nanotubes in the spiraled trench,
  wherein the growing steps are performed such that the first and second bundles are positioned end-to-end such that at least one carbon nanotube of the first bundle has an end that abuts and end of at least one carbon nanotube of the second bundle.

15. The method of claim 14, wherein the growing steps are performed such that the first bundle has a plurality of layers of carbon nanotubes positioned in the spiraled trench and the second bundle has a plurality of layers of carbon nanotubes positioned in the spiraled trench.

16. The method of claim 14, further comprising forming dielectric material in the spiraled trench.

17. The inductor of claim 4, wherein the first coil has a segment comprising at least a first bundle of carbon nanotubes positioned in the spiraled trench and a second bundle of carbon nanotubes positioned in the spiraled trench, wherein the first and second bundles are positioned end-to-end such that at least one carbon nanotube of the first bundle has an end that abuts an end of at least one carbon nanotube of the second bundle.

18. The inductor of claim 4, wherein a width of the first coil is different than a width of the second coil.

19. The transformer of claim 6, wherein the first coil has a segment comprising at least a first bundle of carbon nanotubes positioned in the spiraled trench and a second bundle of carbon nanotubes positioned in the spiraled trench, wherein the first and second bundles are positioned end-to-end such that at least one carbon nanotube of the first bundle has an end that abuts an end of at least one carbon nanotube of the second bundle.

20. The transformer of claim 6, wherein the second coil is electrically separated from the first coil within the spiraled trench.

21. The transformer of claim 20, wherein a width of the first coil is different than a width of the second coil.

22. The magnetic circuit element of claim 9, wherein the first coil has a segment comprising at least a first bundle of carbon nanotubes positioned in the trench and a second bundle of carbon nanotubes positioned in the trench, wherein the first and second bundles are positioned end-to-end such that at least one carbon nanotube of the first bundle has an end that abuts an end of at least one carbon nanotube of the second bundle.

23. The magnetic circuit element of claim 9, wherein a width of the first coil is different than a width of the second coil.

24. An inductor comprising:
  a substrate having a spiraled trench; and
  a first coil of carbon nanotubes positioned in the spiraled trench, the first coil having a first end and a second end, wherein the first coil comprises a first plurality of bundles of carbon nanotubes positioned end-to-end in the spiraled trench from the first end to the second end such that at least one carbon nanotube of each of the first plurality of bundles has an end that abuts an end of at least one carbon nanotube of an adjacent one of the first plurality of bundles
  a second coil of carbon nanotubes positioned in the spiraled trench, the second coil having a third end and a fourth end, wherein the second coil comprises a second plurality of carbon nanotubes positioned end-to-end in the spiraled trench from the third end to the fourth end such that at least one carbon nanotube of each of the second plurality of bundles has an end that abuts an end of at least one carbon nanotube of an adjacent one of the second plurality of bundles,
  wherein the second coil is electrically separated from the first coil within the spiraled trench and spirals in a same direction as the first coil, and wherein a width of the first coil is different than a width of the second coil.

25. The method of claim 13, wherein the growing comprises using magnetic material as a catalyst for growing the carbon nanotubes such that the magnetic material is incorporated into the carbon nanotubes during fabrication of the coil.

26. The method of claim 25, further comprising coating the coil with conductive material.

27. The method of claim 26, wherein the coil has a segment comprising at least a first bundle of carbon nanotubes and a second bundle of carbon nanotubes, wherein the growing further comprises:
  growing the first bundle of carbon nanotubes in the spiraled trench; and
  growing the second bundle of carbon nanotubes in the spiraled trench,
  wherein the growing the first bundle and the growing the second bundle are performed such that the first bundle and the second bundle are positioned end-to-end such that at least one carbon nanotube of the first bundle has an end that abuts an end of at least one carbon nanotube of the second bundle.

28. The inductor of claim 24, wherein magnetic material is incorporated into the first plurality of bundles, and wherein the first coil is coated with a conductive coil.

29. The method of claim 1, wherein magnetic material is incorporated into the first bundle of carbon nanotubes and into the second bundle of carbon nanotubes, and wherein the coil is coated with a conductive material.

* * * * *

UNITED STATES PATENT AND TRADEMARK OFFICE
CERTIFICATE OF CORRECTION

PATENT NO. : 9,793,039 B1
APPLICATION NO. : 13/464783
DATED : October 17, 2017
INVENTOR(S) : Jaber A. Abu Qahouq It is certified that error appears in the above-identified patent and that said Letters Patent is hereby corrected as shown below:

In the Claims

Column 9, Claim 13, Line 2: Change "coils comprise comprises carbon" to --coils comprise carbon--

Signed and Sealed this
Seventh Day of August, 2018

Andrei Iancu
*Director of the United States Patent and Trademark Office*